United States Patent
Shin et al.

(10) Patent No.: US 8,459,209 B1
(45) Date of Patent: Jun. 11, 2013

(54) PET DRYING TOWEL AND METHOD

(76) Inventors: Young M. Shin, Chicago, IL (US);
David T. Shin, Chicago, IL (US)

( * ) Notice: Subject to any disclaimer, the term of this patent is extended or adjusted under 35 U.S.C. 154(b) by 20 days.

(21) Appl. No.: 13/330,672

(22) Filed: Dec. 20, 2011

(51) Int. Cl.
*A01K 13/00* (2006.01)

(52) U.S. Cl.
USPC .......................................... 119/651; 119/652

(58) Field of Classification Search
USPC ................. 119/651, 650, 652, 654, 653, 600, 119/606, 601, 850; D30/158; 2/69, 88
See application file for complete search history.

(56) References Cited

U.S. PATENT DOCUMENTS

| | | | | |
|---|---|---|---|---|
| 3,084,346 | A * | 4/1963 | Stelter | 2/84 |
| 3,884,191 | A * | 5/1975 | Stout | 119/671 |
| D291,014 | S * | 7/1987 | Grum | D22/119 |
| 4,718,375 | A * | 1/1988 | Krieger | 119/678 |
| 5,625,897 | A * | 5/1997 | Park | 2/69 |
| 6,505,367 | B2 * | 1/2003 | Griffin et al. | 5/655 |
| 8,307,462 | B1 * | 11/2012 | Kenney Purcaro | 2/48 |
| 8,371,246 | B1 * | 2/2013 | Streng | 119/606 |
| 2007/0234970 | A1 * | 10/2007 | Farzan et al. | 119/850 |
| 2007/0289558 | A1 * | 12/2007 | Bonfoey | 119/850 |
| 2007/0295281 | A1 * | 12/2007 | Fortson et al. | 119/601 |
| 2009/0235871 | A1 * | 9/2009 | Andreas et al. | 119/601 |
| 2011/0259280 | A1 * | 10/2011 | Partridge et al. | 119/601 |

* cited by examiner

*Primary Examiner* — T. Nguyen
(74) *Attorney, Agent, or Firm* — Richards Patent Law P.C.

(57) ABSTRACT

A pet drying towel includes: a first, ring-shaped, absorbent surface including an inner circumference and a concentric outer circumference, wherein the first absorbent surface faces a first direction and the length of the first absorbent surface between the inner circumference and the outer circumference is generally sized to span the length of the pet from the pet's front shoulders through the pet's hindquarters; and a second, ring-shaped, absorbent surface including an inner circumference and a concentric outer circumference, wherein the second absorbent surface faces a second direction opposite to the first direction; wherein the inner circumference of the first absorbent surface and the inner circumference of the second absorbent surface form an inner circumference of the towel; further wherein the inner circumference of the towel forms a central circular opening sized to allow the pet's head to pass through, but not to allow the pet's front shoulders to pass though.

11 Claims, 10 Drawing Sheets

PET DRYING TOWEL AND METHOD

BACKGROUND OF THE INVENTION

The present subject matter relates generally to a pet drying towel and a method of using the pet drying towel. More specifically, the present invention relates to an absorbent towel having a central circular opening, which allows a pet's head to be inserted through such opening so that (i) the towel may sit on the shoulders and body of the pet and (ii) the towel may be used to dry the pet. One side of the towel may be designated for drying the pet's body and the other side of the towel may be designated for drying the pet's head and neck. Once a pet's head is inserted through the central circular opening and the towel sits on the shoulders and body of the pet, the towel may be used to dry the pet using a dry portion of the towel, and then, as needed, the user may rotate the towel around the pet's neck to dry the pet's body using different portions of the first side of the towel and fold the towel to dry the pet's head and neck with the second side of the towel.

Drying a pet can be a frustrating experience. It is difficult to hold the towel on the pet and dry the pet off at the same time. A person drying the pet must simultaneously juggle at least one towel while trying to dry the pet. This can be challenging since many pets have trouble staying still and do not like to be dried off. Dogs may be especially tricky to dry, as their natural response to being wet is to shake. Consequently, the towel may not stay on the pet while drying the pet. Another problem that pet owners face is that they have a hard time finding dry parts of the towel after they start the drying process.

Previous attempts to solve this problem included using towels intended to be secured to a pet while the person was drying the pet. These attempts made drying a pet slightly easier since the person didn't have to worry about keeping the towel in contact with the pet. However, the way in which these towels were attached to the pet was limiting and difficult to use. Also, once the towel was saturated and no longer capable of drying the pet, it needed to be removed, and a new towel needed to be reapplied.

One invention attempted to solve this problem by creating a rectangular towel with an opening for a pet's head that could be secured by hook and loop fasteners. However, it was difficult to secure the rectangular towel around the pet's neck when the pet was moving around. If the hook and loop fasteners came undone, they needed to be refastened so the towel would stay on the pet, which was also tedious. The opening for the pet's head was located near one end of the rectangular towel; thus, limiting the parts of the towel that could be used to dry the pet. When the towel was fastened and parts of the towel were saturated, the towel was immobile and could not be rotated such that the user could apply a dryer part of the towel to the pet. This meant that when the towel was saturated, it needed to be removed, and a new towel needed to be reapplied.

Accordingly, a need exists for a pet drying towel and method of using the pet drying towel including an absorbent ring-shaped towel having a central circular opening where multiple drying surfaces may be used to dry a pet as described and claimed herein.

BRIEF SUMMARY OF THE INVENTION

The present subject matter discloses a pet drying towel and method of using the pet drying towel that includes an absorbent ring-shaped towel having a central circular opening, which allows a pet's head to be inserted through such opening so that (i) the towel may sit on the shoulders and body of the pet and (ii) the towel may be used to dry the pet. One side of the towel may be designated for drying the pet's body and the other side of the towel may be designated for drying the pet's head and neck. Once a pet's head is inserted through the central circular opening and the towel sits on the shoulders and body of the pet, the towel may be used to dry the pet using a dry portion of the towel, and then, as needed, the user may rotate the towel around the pet's neck to dry the pet's body using different portions of the first side of the towel and fold the towel to dry the pet's head and neck with the second side of the towel.

Similar to conventional towels, both sides of the pet drying towel may be absorbent; thus, the first surface and the second surface of the towel may be used to dry the pet. However, this pet drying towel may use both surfaces without having to take off the towel. Instead, a person drying the pet can simply fold the towel and dry the pet's head and neck, for example, with the second side of the towel. This method allows for easy access to all portions of the towel on both the first and second sides of the towel.

Since the pet drying towel is capable of being rotated around the pet's neck so that other portions of the towel may be used to dry the pet, it allows for an easy and efficient drying method of finding and using dryer portions of the towel. Once a particular portion of the towel is saturated, the towel may be rotated so that other portions of the towel may be used to further dry the pet. Once the pet drying towel is placed onto the pet, every portion of the pet drying towel is capable of being used to dry the pet. The pet drying towel need only be folded or rotated to allow different portions to dry the pet.

In one example, a towel for drying a four-legged pet having a head, neck, front shoulders and hindquarters includes a first, ring-shaped, absorbent surface including an inner circumference and a concentric outer circumference, wherein the first absorbent surface faces a first direction. The towel also includes a second, ring-shaped, absorbent surface including an inner circumference and a concentric outer circumference, wherein the second absorbent surface faces a second direction opposite to the first direction. The inner circumference of the first absorbent surface and the inner circumference of the second absorbent surface form an inner circumference of the towel. The inner circumference of the towel forms a central opening sized to allow the pet's head to pass through, but not to allow the pet's front shoulders to pass through.

In some embodiments, the first absorbent surface and the second absorbent surface are made from a single piece of fabric. In other examples, the towel is formed from multiple pieces of fabric joined along at least the inner circumference. In some embodiments in which the towel is made from at least two pieces of fabrics, the outer circumferences of the multiple pieces are the same size. In other embodiments, the outer circumferences are different sizes. For those embodiments in which the outer circumferences are the same size, some of the examples are joined along their common outer circumference. In others, the fabrics are joined only along their common inner circumference.

In certain embodiments, the length of the first absorbent surface and second absorbent surface measured from the inner circumference to the outer circumference is sized to span the length of the pet from the pet's front shoulders through the pet's hindquarters. In still other examples, particularly those in which there are at least two fabrics with varying sizes of outer circumferences, one of the drying surfaces may be sized only to span from the pet's front shoulders to the midpoint between the pet's front shoulders and about the pet's hindquarters.

In some embodiments, the elements of the towel may be joined together and/or reinforced by stitching an edging material along the inner circumference and/or outer circumference of the towel.

In one example, the method for drying a four-legged pet having a head, neck, front shoulders and hindquarters using a towel, includes the following steps. The first step is providing a dry towel, such as, the towel described herein. The second step of the method includes placing a pet's head through the inner circumference of the towel such that inner circumference of the towel rests along the pet's front shoulders and the first absorbent surface faces the pet's body. The third step is extending an outer circumference of the towel to substantially cover the body of the pet through the hindquarters. Then a person may dry the pet's body using the portion of the first absorbent surface generally in contact with the pet's body creating a damp portion of the first absorbent surface and a dry portion of the first absorbent surface. If desired, the person may rotate the towel around the pet's neck to place the dry portion of the first absorbent surface generally in contact with the pet's body and repeating the steps of drying the pet's body and rotating the towel around the pet's neck until the pet's body is generally dry.

The next step is placing the second absorbent surface generally in contact with the pet's head and neck. The person may dry the pet's head and neck using the second absorbent surface creating a damp portion of the second absorbent surface and a dry portion of the second absorbent surface. If desired, the person may rotate the towel around the pet's neck to the dry portion of the second absorbent surface generally in contact with the pet's head and neck and repeating the steps of drying the pet's head and neck and rotating the towel around the pet's neck until the pet's head and neck are generally dry.

The step of placing the second absorbent surface generally in contact with the pet's head and neck may occur before the step of rotating the towel around the pet's neck to place the dry portion of the first absorbent surface generally in contact with the pet's body. Also, the step of placing the second absorbent surface generally in contact with the pet's head and neck may occur after the pet's body is generally dry.

An advantage of the pet drying towel is that it may be rotated to provide maximum absorbency.

Another advantage of the pet drying towel is that both sides of the towel may be used to dry a pet.

A further advantage of the pet drying towel is that due to the location of the central circular opening, the towel may remain on the pet without the user holding the towel.

Yet another advantage of the pet drying towel is that the method requires less time and energy when drying a pet.

Another advantage of the pet drying towel is that due to its design the towel may not be confused with human bathing towels.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

Figure 1:
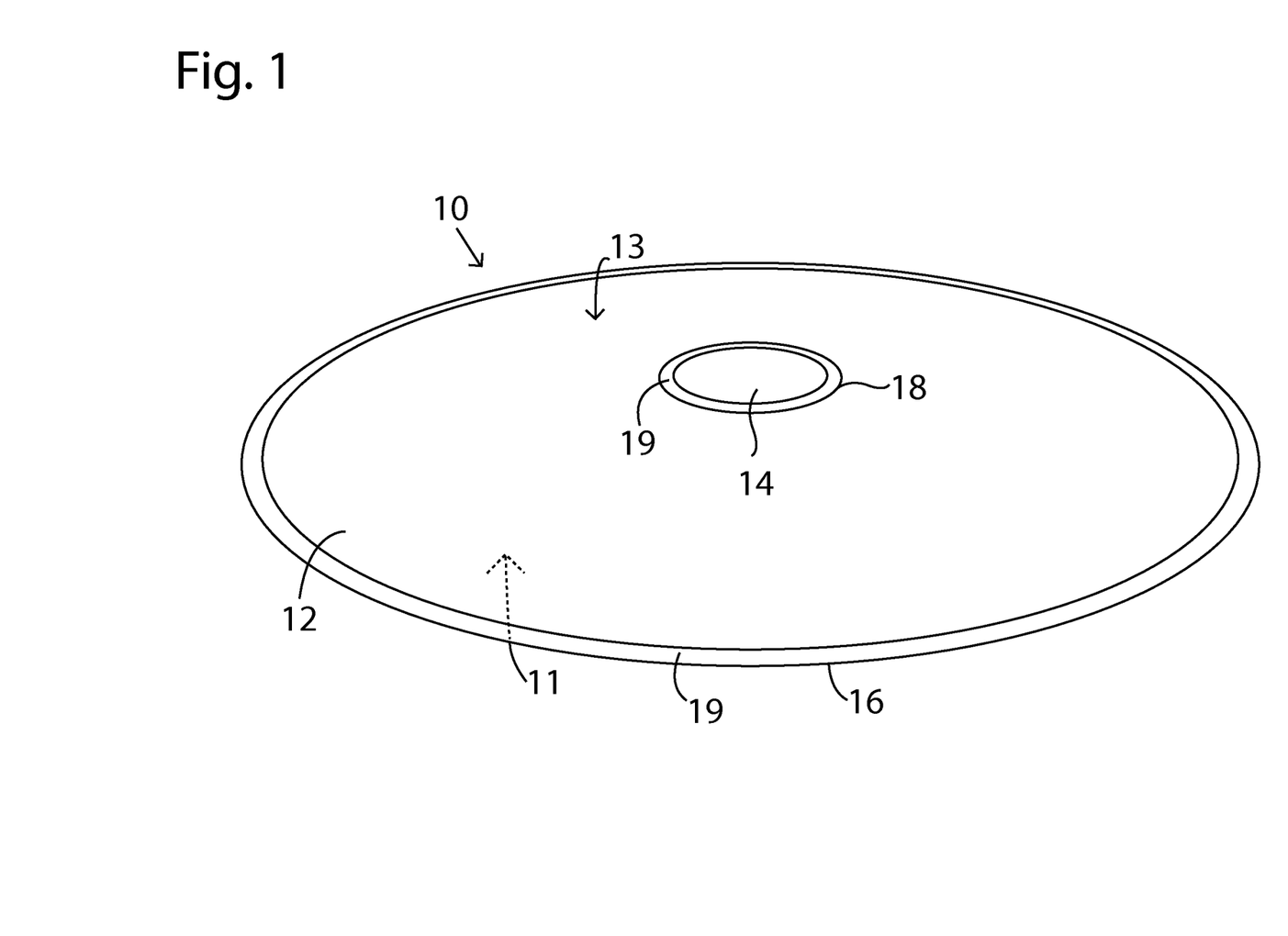
FIG. 1 is a perspective view of an example of the pet drying towel.
Figure 5:
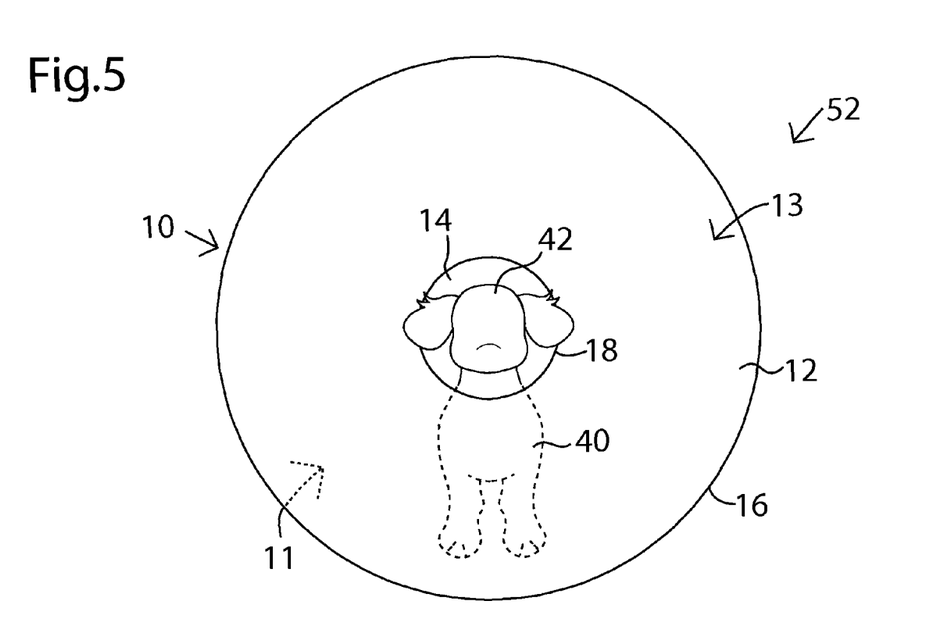
FIG. 5 illustrates the first step of using the pet drying towel.

FIG. 1 illustrates an example of a pet drying towel 10. As shown in FIG. 1, the pet drying towel 10 includes a circular fabric 12 including a central opening 14. As shown in FIG. 1, the pet drying towel 10 includes two drying surfaces, a first absorbent surface 11 and a second absorbent surface 13, with each side being made from a fabric suitable for drying a pet 40 (FIG. 5). Therefore, no care needs to be taken to place any particular side upward or downward when placing the pet drying towel 10 onto the pet 40.

Once the pet's head 42 is inserted through the central circular opening 14 and the towel sits on the shoulders and body of the pet, both the first absorbent surface 11 and second absorbent surface 13 may be used without removing the pet drying towel 10 from around the pet's neck.

The fabric 12 may be one layer or multiple layers of fabric 12. For example, in certain embodiments, each side of the pet drying towel 10 may include a separate layer of fabric 12. In other embodiments, the fabric 12 may be a unitary layer. In various contemplated embodiments, the fabric 12 may be made from various fibers such as terrycloth, cotton, bamboo or other woven or non-woven fibers. However, it is contemplated that the fabric 12 may be made from any suitably absorbent fabric as will be recognized by one having ordinary skill in the art in light of the disclosure herein.

Figure 2:
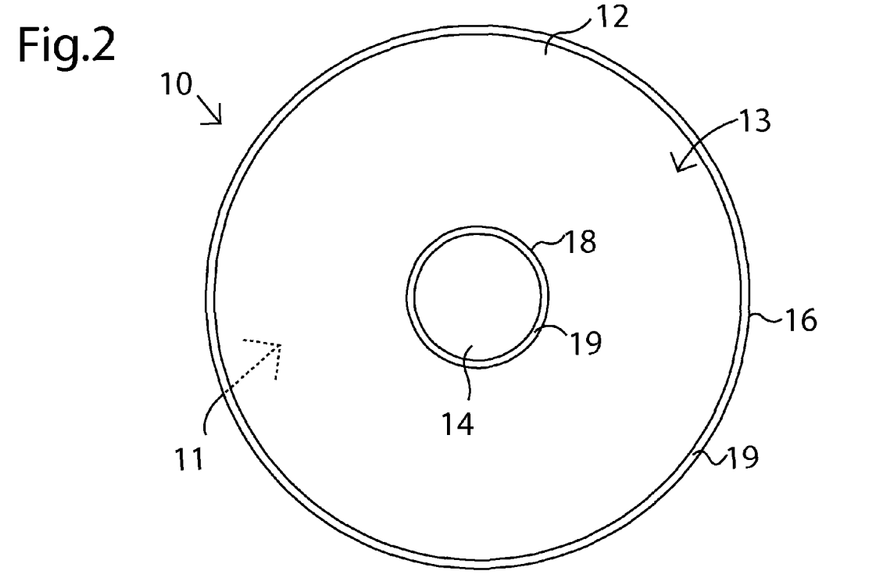
FIG. 2 is an aerial view of the pet drying towel.

Further shown in FIGS. 1 and 2, the pet drying towel 10 includes an outer circumference 16 and an inner circumference 18. The inner circumference 18 of the towel 10 forms the central opening 14 sized to allow the pet's head 42 to pass through, but not to allow the pet's front shoulders to pass through. The length of the first absorbent surface 11 and second absorbent surface 13 measured from the inner circumference 18 to the outer circumference 16 is generally sized to span the length of the pet 40 from the pet's front shoulders through the pet's hindquarters. Accordingly, the pet drying towel 10 may be offered in various sizes to correspond to the size of the pet 40 for which it is to be used.

The inner circumference 18 and the outer circumference 16 of the towel 10 may be reinforced with an edging material 19. In a preferred embodiment, the edging material 19 is stitched to the fabric 12 along the inner circumference 18 and the outer circumference 16. If the fabric 12 is formed from multiple layers, the edging material 19 may also help maintain the form of the pet drying towel 10.

Figure 3:
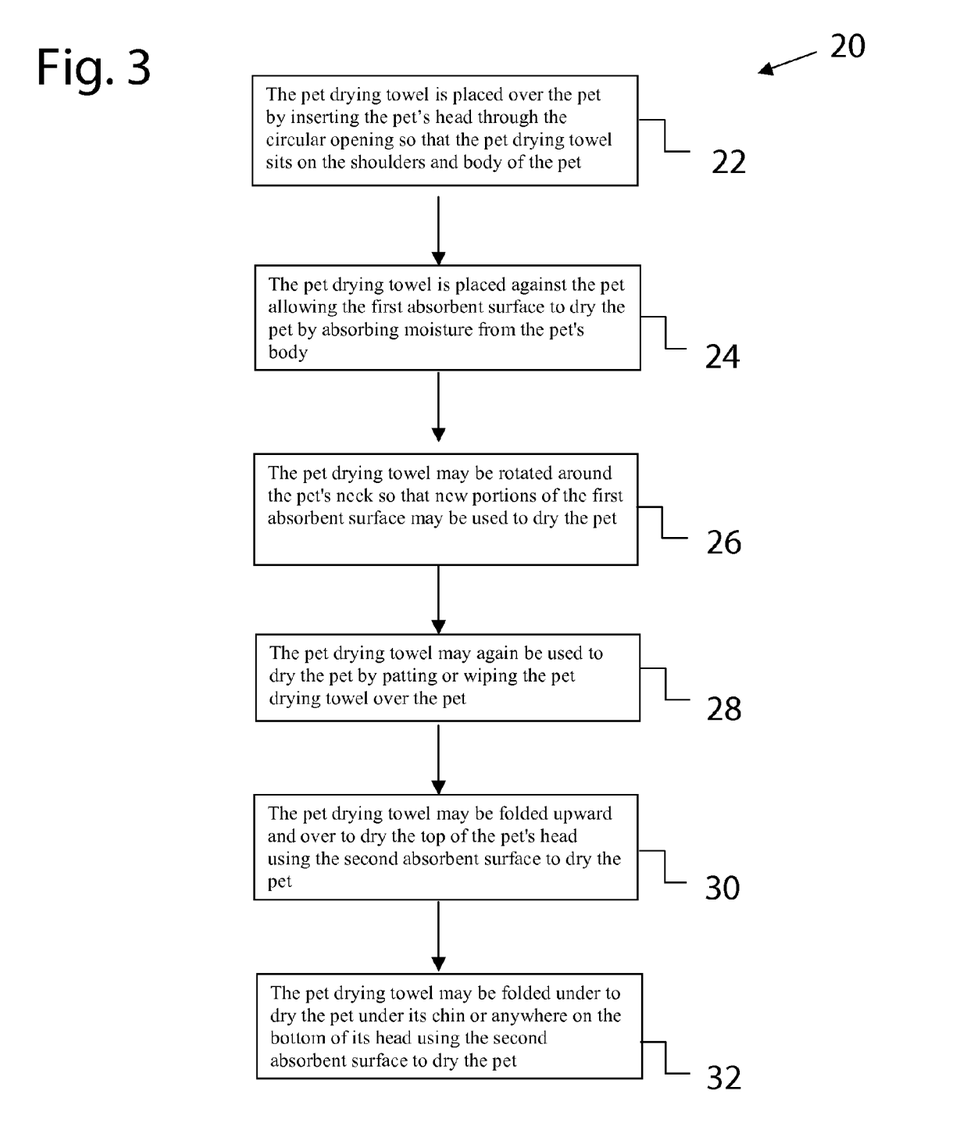
FIG. 3 is a flowchart illustrating the method of using the pet drying towel.

FIG. 3 illustrates the method 20 of using the pet drying towel 10. In the first step 22, the pet drying towel 10 is placed over the pet 40 by inserting the pet's head 42 through the circular opening 14 so that the pet drying towel 10 sits on the shoulders and body of the pet 40. In the second step 24, the pet drying towel 10 is placed against the pet 40 allowing the first absorbent surface 11 to dry the pet 40 by absorbing moisture from the pet's body. The pet drying towel 10 may be used to pat or wipe the pet 40. In the third step 26, the pet drying towel 10 may be rotated around the pet's neck 42 so that new portions of the first absorbent surface 11 may be used to dry the pet 40 as portions of the pet drying towel 10 may have become saturated. In the fourth step 28, the pet drying towel 10 may again be used to dry the pet 40 by patting or wiping the pet drying towel 10 over the pet 40. In the fifth step 30, the pet drying towel 10 may be folded upward and over to dry the top of the pet's head 42. This step uses a second absorbent surface 13 to dry the pet 40. In the sixth and final step 32, the pet drying towel 10 may be folded under to dry the pet 40 under its chin or anywhere on the bottom of its head 42. This motion also uses the second absorbent surface 13 to dry the pet 40. Any of the steps may be repeated as desired to dry the pet 40.

Figure 4:
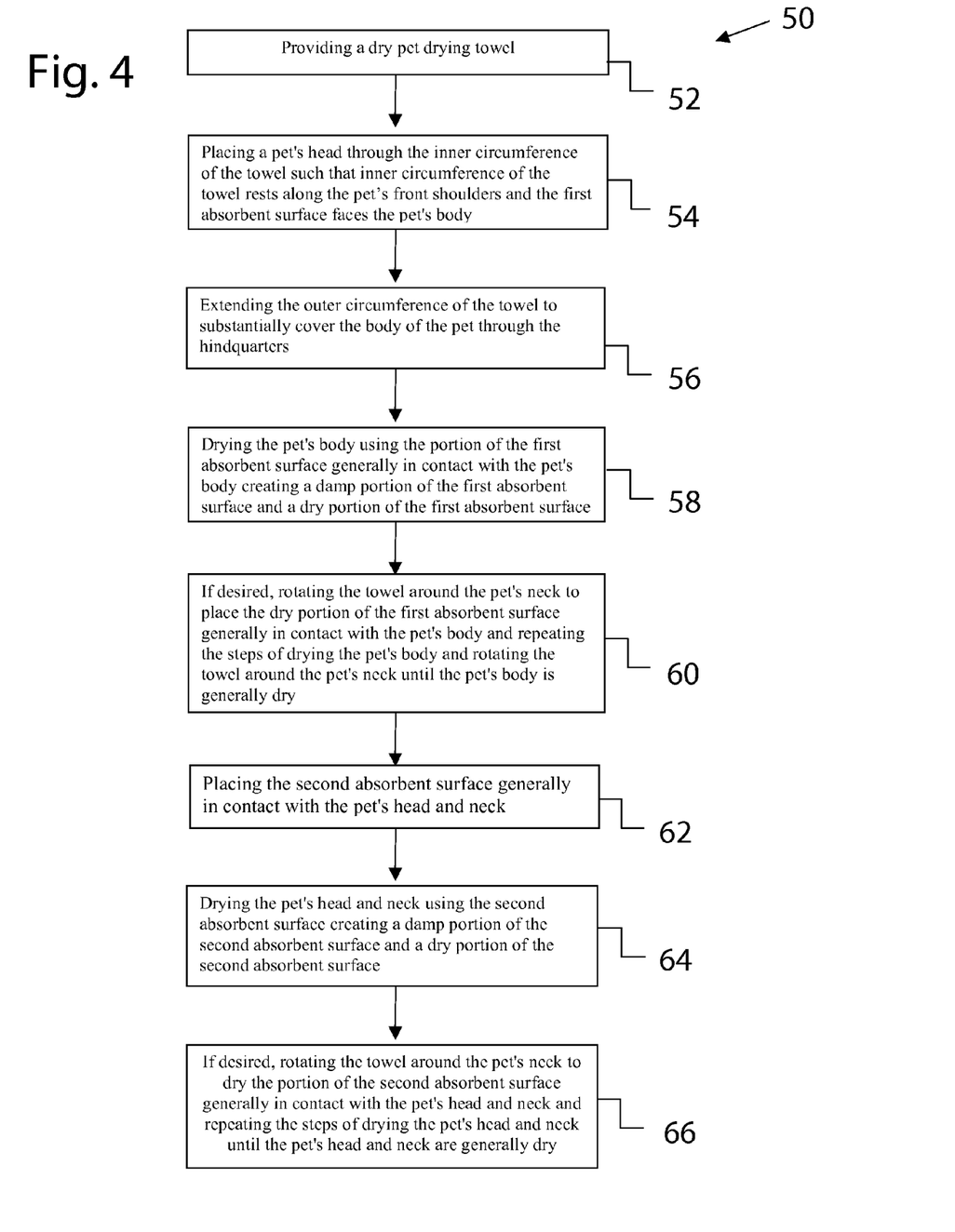
FIG. 4 is a flowchart illustrating an example of a preferred method of using the pet drying towel.

FIG. 4 illustrates another example of a method 50 of drying a pet using the pet drying towel 10 described above with reference to FIGS. 1-3. As shown in FIG. 5, the method 50 includes a first step 52 of providing a dry towel 10, such as the pet drying towel 10 described above with reference to FIGS. 1-3.

The second step 54 includes placing a pet's head through the inner circumference 18 of the towel 10 such that inner circumference 18 of the towel 10 rests along the pet's front shoulders and the first absorbent surface 11 faces the pet's body.

The third step 56 includes extending the outer circumference 16 of the towel 10 to substantially cover the body of the pet 40 through the hindquarters.

The fourth step 58 includes drying the pet's body using the portion of the first absorbent surface 11 generally in contact with the pet's body creating a damp portion of the first absorbent surface 11 and a dry portion of the first absorbent surface 11.

The fifth step 60 includes, if desired, rotating the towel 10 around the pet's neck to place the dry portion of the first absorbent surface 11 generally in contact with the pet's body and repeating the steps of drying the pet's body and rotating the towel 10 around the pet's neck until the pet's body is generally dry.

The sixth step 62 includes placing the second absorbent surface 13 generally in contact with the pet's head and neck.

The seventh step 64 includes drying the pet's head and neck using the second absorbent surface 13 creating a damp portion of the second absorbent surface 13 and a dry portion of the second absorbent surface 13.

The eighth step 66 includes, if desired, rotating the towel 10 around the pet's neck to the dry portion of the second absorbent surface 13 generally in contact with the pet's head and neck and repeating the steps of drying the pet's head and neck and rotating the towel 10 around the pet's neck until the pet's head and neck are generally dry.

FIGS. 5-9 illustrate the method 50 of using the pet drying towel 10 described in FIG. 4. FIG. 5 illustrates the first step 52 of the method 50 in which the pet drying towel 10 described above with respect to FIGS. 1-3 is provided to be used to dry a pet 40, in this case a dog.

Figure 6:
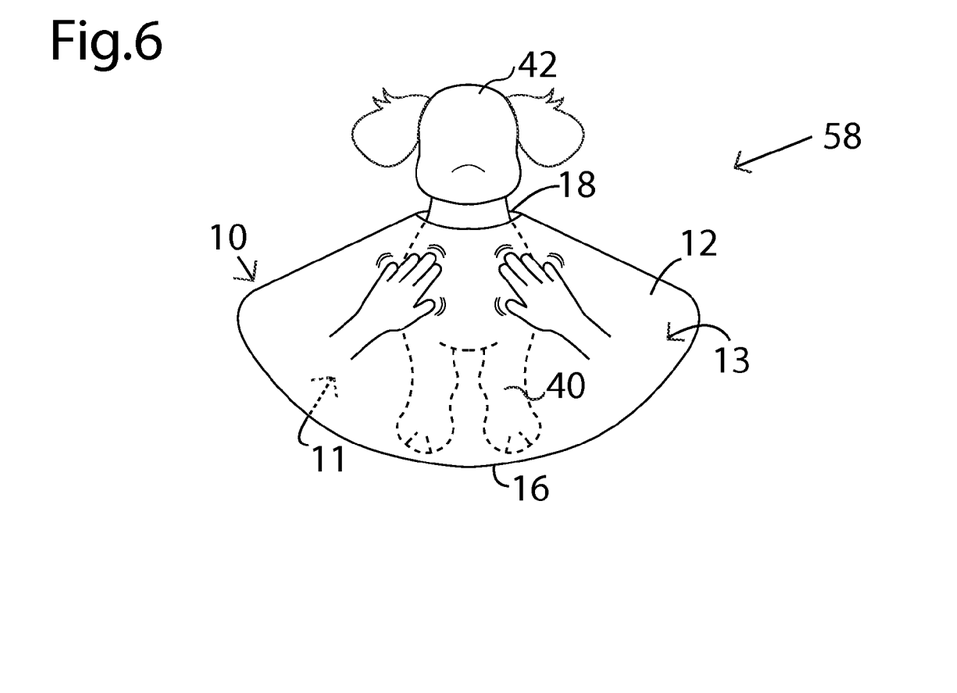
FIG. 6 illustrates the second step of using the pet drying towel.
Figure 7:
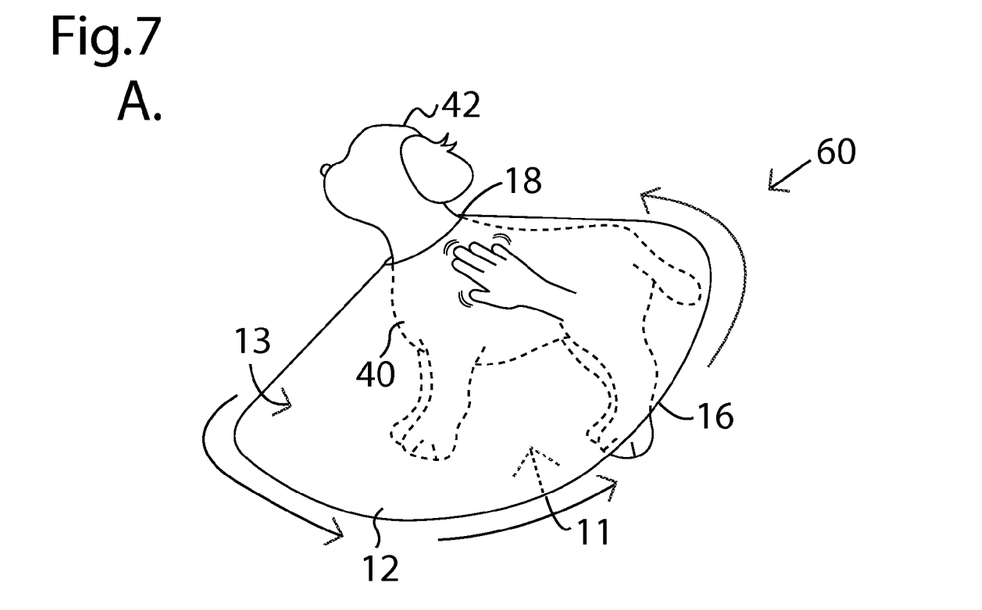
FIGS. 7A-B illustrate the third steps of using the pet drying towel.
Figure 8:
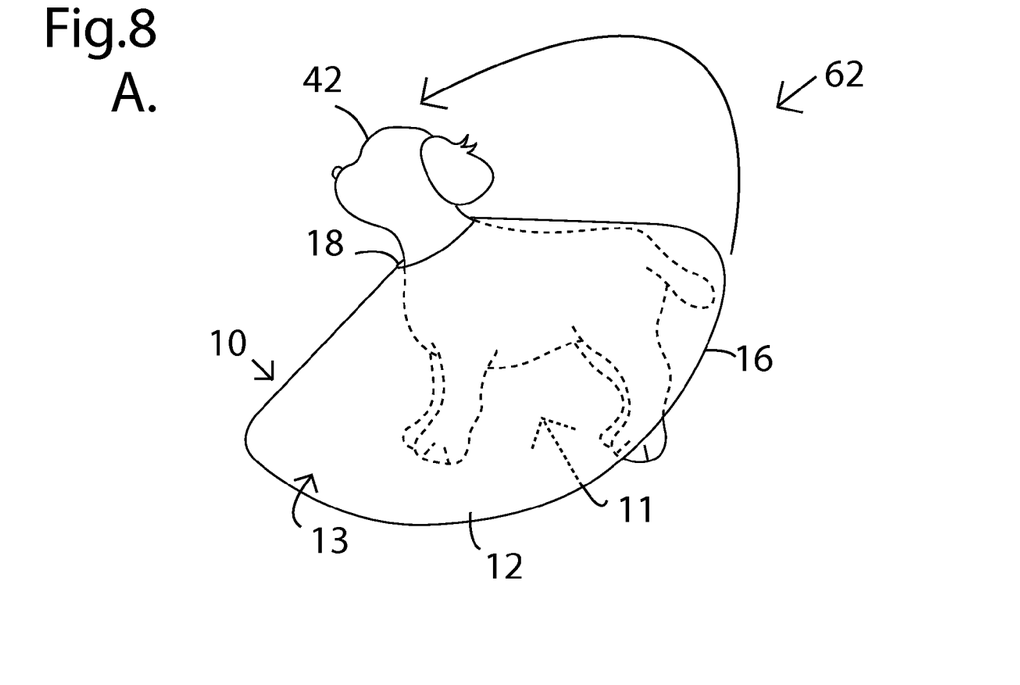
FIGS. 8A-B illustrate the fourth steps of using the pet drying towel.
Figure 9:
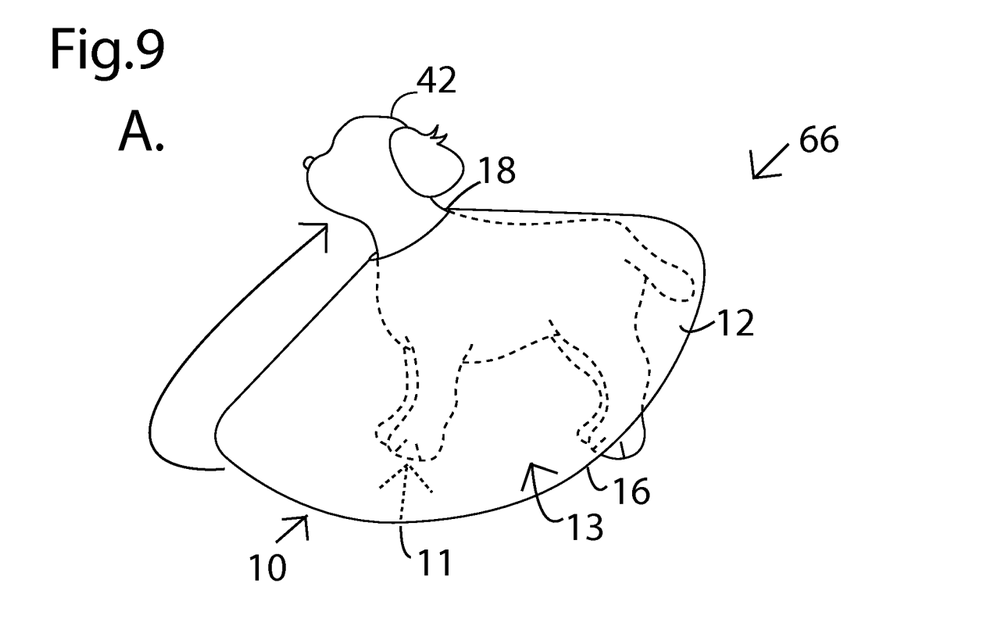
FIGS. 9A-B illustrate the fifth steps of using the pet drying towel.

As shown in FIG. 6, the pet's head 42 is placed through the inner circumference 18 of the towel 10 such that inner circumference 18 of the towel 10 rests along the pet's front shoulders and the first absorbent surface 11 faces the pet's body.

Turning now to FIGS. 7A and 7B, the outer circumference 16 of the towel 10 is extended to substantially cover the body of the pet 40 through the hindquarters. Also shown in FIGS. 7A and 7B is drying the pet's body using the portion of the first absorbent surface 11 generally in contact with the pet's body creating a damp portion of the first absorbent surface 11 and a dry portion of the first absorbent surface 11. Then, if desired, the person may rotate the towel 10 around the pet's neck to place the dry portion of the first absorbent surface 11 generally in contact with the pet's body and repeating the steps of drying the pet's body and rotating the towel 10 around the pet's neck until the pet's body is generally dry.

The next steps, shown collectively in FIGS. 8A, 8B, 9A and 9B include placing the second absorbent surface 13 generally in contact with the pet's head 42 and neck and drying the pet's head 42 and neck using the second absorbent surface 13, thereby creating a damp portion of the second absorbent surface 13 and a dry portion of the second absorbent surface 13. Then, if desired, the person may rotate the towel 10 around the pet's neck to the dry portion of the second absorbent surface 13 generally in contact with the pet's head 42 and neck and repeating the steps of drying the pet's head and neck and rotating the towel 10 around the pet's neck until the pet's head 42 and neck are generally dry.

While shown and described as a linear progression, first drying the pet's body and then drying the pet's head and neck, it is understood that the two surfaces of the pet drying towel 10 may be used to dry the body and the head and neck of the pet before the towel 10 is rotated to find a dry portion. Particularly since the user will be dealing with a wet animal, it is understood that the logical order of the steps as described herein may become scrambled in practical use. The steps of the methods 20 and 50 may be repeated any number of times or carried out in any order so that the pet drying towel 10 may effectively dry the pet 40.

While described above with respect to the embodiment of the pet drying towel 10 shown in FIG. 1, it is contemplated that various forms of the pet drying towel 10 may be implemented. In some embodiments, the first absorbent surface 11 and the second absorbent surface 13 are made from a single piece of fabric. In other examples, the pet drying towel 10 is formed from multiple pieces of fabric joined along at least the inner circumference 18. In some embodiments in which the towel is made from at least two pieces of fabrics, the outer circumferences 16 of the multiple pieces are the same size. In other embodiments, the outer circumferences 16 are different sizes. For those embodiments in which the outer circumferences 16 are the same size, some of the examples are joined along their common outer circumference 16. In others, the fabrics are joined only along their common inner circumference 18.

Figure 10:
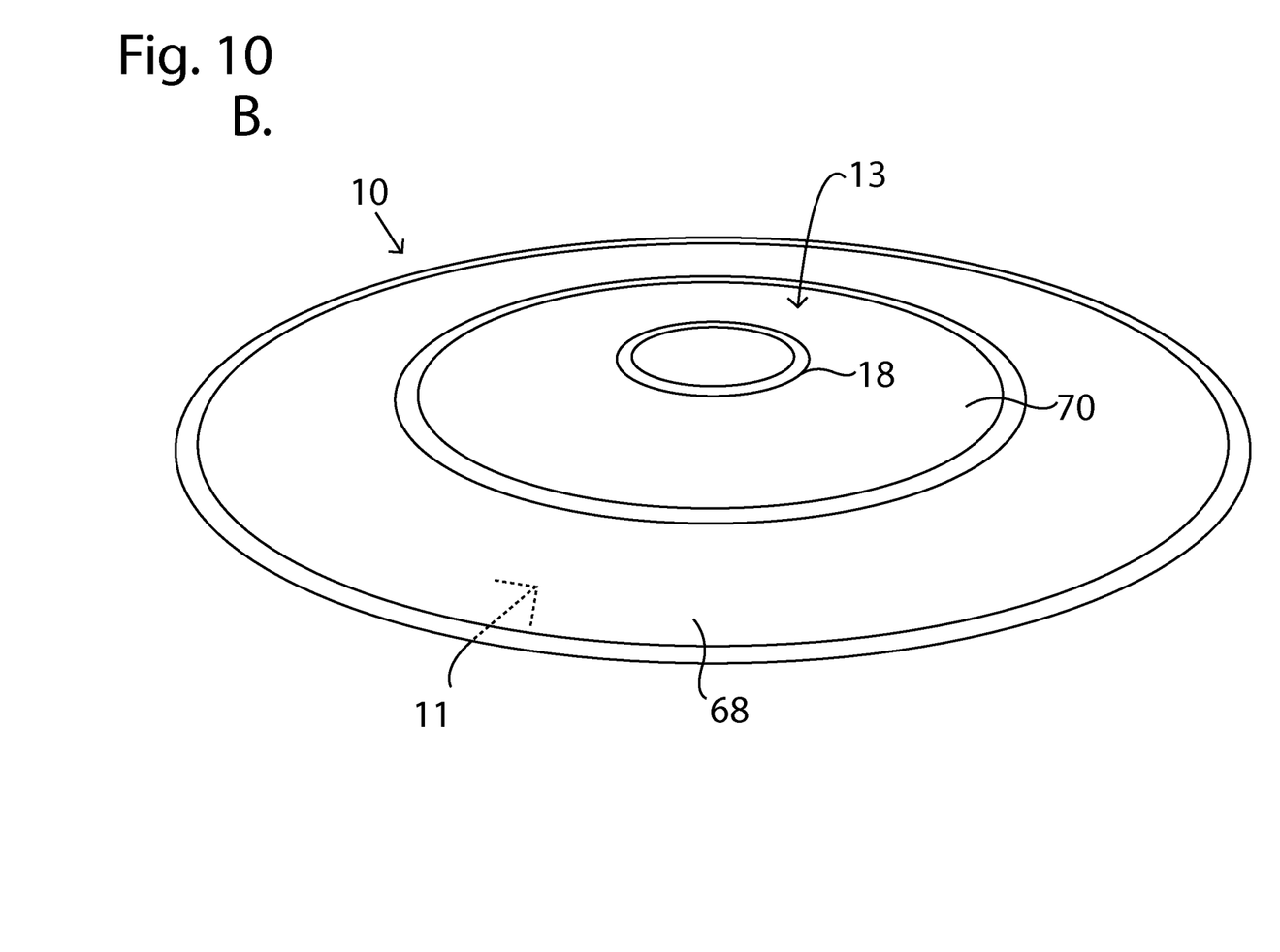
FIGS. 10A-B is a perspective view of another example of the pet drying towel.
Figure 10A:
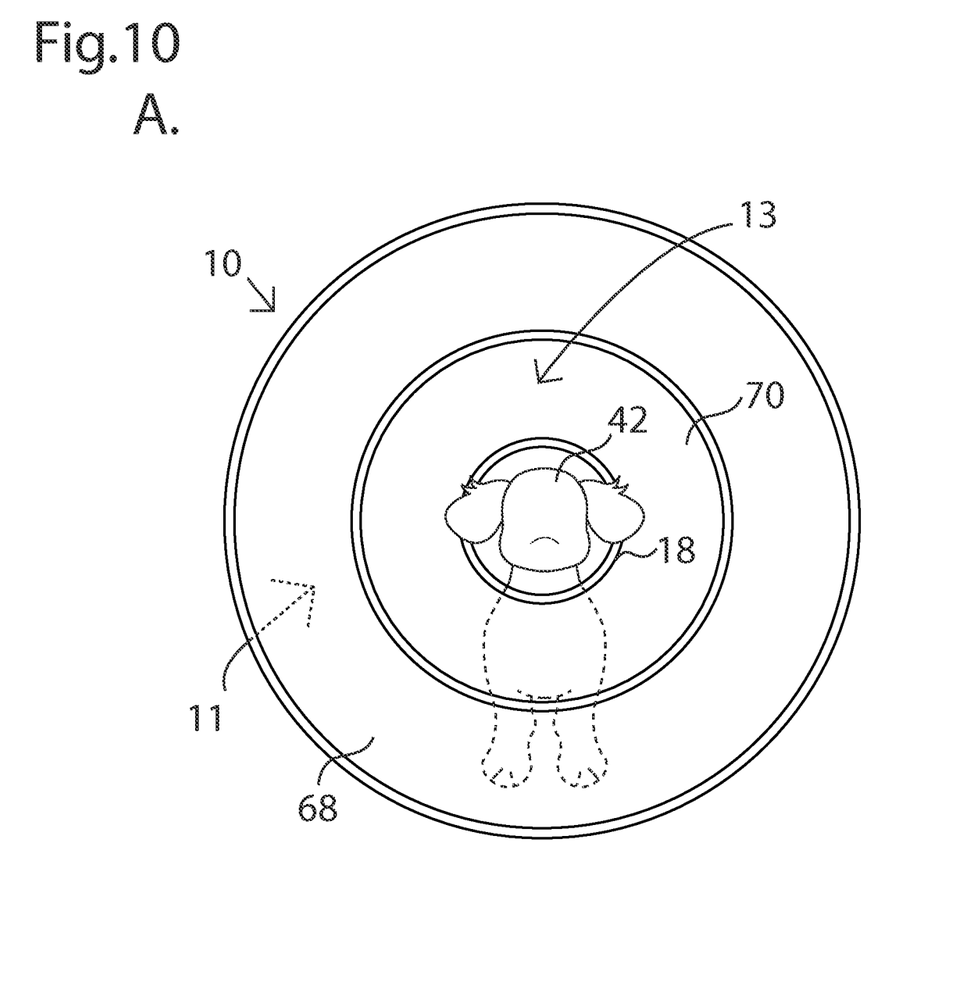

FIGS. 10A and 10B illustrate another example of a pet drying towel 10 including a first absorbent surface 11 embodied in a first piece of material 68 and a second absorbent surface 13 embodied in a second piece of material 70. As shown, the second piece of material 70 is a smaller diameter circular piece of material than the first piece of material 68 and the two pieces of material 68 and 70 are joined along their common inner circumference 18. Such an embodiment may be used wherein the first absorbent surface 11 and the first piece of material 68 may be used to dry the pet's body and the second absorbent surface 13 and the second piece of material 70 may be used to dry the pet's head 42 in a manner consistent with the methods described herein. Accordingly, the second piece of material 70 may be sized only to span from the pet's front shoulders to the midpoint between the pet's front shoulders and about the pet's hindquarters. Of course, various other configurations of the pet drying towel 10 may be utilized.

It should be noted that various changes and modifications to the presently preferred embodiments described herein will be apparent to those skilled in the art. Such changes and modifications may be made without departing from the spirit and scope of the present invention and without diminishing its attendant advantages.

We claim:

1. A method for drying a four-legged pet having a head, neck, front shoulders and hindquarters using a towel, the method comprising the steps of:

providing a dry towel, wherein the towel includes:
   a first, ring-shaped, absorbent surface including an inner circumference and a concentric outer circumference, wherein the first absorbent surface faces a first direction and the length of the first absorbent surface between the inner circumference and the outer circumference is generally sized to span the length of the pet from the pet's front shoulders through the pet's hindquarters; and
   a second, ring-shaped, absorbent surface including an inner circumference and a concentric outer circumference, wherein the second absorbent surface faces a second direction opposite to the first direction;
   wherein the inner circumference of the first absorbent surface and the inner circumference of the second absorbent surface form an inner circumference of the towel;
   further wherein the inner circumference of the towel forms a central circular opening sized to allow the pet's head to pass through, but not to allow the pet's front shoulders to pass though;
placing a pet's head through the inner circumference of the towel such that inner circumference of the towel rests along the pet's front shoulders and the first absorbent surface faces the pet's body;
extending the outer circumference of the towel to substantially cover the body of the pet through the hindquarters;
drying the pet's body using the portion of the first absorbent surface generally in contact with the pet's body creating a damp portion of the first absorbent surface and a dry portion of the first absorbent surface;
rotating the towel around the pet's neck to place the dry portion of the first absorbent surface generally in contact with the pet's body and repeating the steps of drying the pet's body and rotating the towel around the pet's neck until the pet's body is generally dry;
placing the second absorbent surface generally in contact with the pet's head and neck;
drying the pet's head and neck using the second absorbent surface creating a damp portion of the second absorbent surface and a dry portion of the second absorbent surface; and
rotating the towel around the pet's neck to the dry portion of the second absorbent surface generally in contact with the pet's head and neck and repeating the steps of drying the pet's head and neck and rotating the towel around the pet's neck until the pet's head and neck are generally dry.

2. The method of claim 1 wherein the step of placing the second absorbent surface generally in contact with the pet's head and neck occurs before the step of rotating the towel around the pet's neck to place the dry portion of the first absorbent surface generally in contact with the pet's body.

3. The method of claim 1 wherein the step of placing the second absorbent surface generally in contact with the pet's head and neck occurs after the pet's body is generally dry.

4. The method of claim 1 wherein the first absorbent surface and the second absorbent surface are a single piece of material.

5. The method of claim 4 wherein the inner circumference of the towel is reinforced.

6. The method of claim 5 wherein the inner circumference of the towel is reinforced by stitching an edging material along the inner circumference.

7. The method of claim 6 wherein the outer circumference of the towel is reinforced by stitching an edging material along the outer circumference.

8. The method of claim 1 wherein the first absorbent surface is a first piece of material and the second absorbent surface is a second piece of material.

9. The method of claim 8 wherein the first piece of material and the second piece of material are joined together along their outer circumferences.

10. The method of claim 8 wherein the first piece of material and the second piece of material are not joined together along their outer circumferences.

11. The method of claim 10 wherein the first piece of material and second piece of material are different sizes.

* * * * *